(12) United States Patent
Philippe et al.

(10) Patent No.: US 7,818,962 B2
(45) Date of Patent: Oct. 26, 2010

(54) METHOD FOR CONTROL OF A PROPULSION SYSTEM COMPRISING A DIESEL ENGINE AND A NITROGEN OXIDES TRAP

(75) Inventors: Laurent Philippe, Maisons Laffitte (FR); Jerome Cruchet, Breuillet (FR)

(73) Assignee: Renault s.a.s., Boulogne Billancourt (FR)

( * ) Notice: Subject to any disclaimer, the term of this patent is extended or adjusted under 35 U.S.C. 154(b) by 0 days.

(21) Appl. No.: 10/561,446

(22) PCT Filed: Jun. 11, 2004

(86) PCT No.: PCT/FR2004/001464

§ 371 (c)(1),
(2), (4) Date: Mar. 20, 2007

(87) PCT Pub. No.: WO2005/003539

PCT Pub. Date: Jan. 13, 2005

(65) Prior Publication Data

US 2007/0271909 A1 Nov. 29, 2007

(30) Foreign Application Priority Data

Jun. 23, 2003 (FR) .................................. 03 07525

(51) Int. Cl.
*F01N 3/00* (2006.01)

(52) U.S. Cl. ............................. 60/295; 60/274; 60/285; 60/286; 60/297; 60/303

(58) Field of Classification Search .................. 60/274, 60/285, 286, 295, 297, 303, 311
See application file for complete search history.

(56) References Cited

U.S. PATENT DOCUMENTS 5,732,554 A * 3/1998 Sasaki et al. ................... 60/278

(Continued)

FOREIGN PATENT DOCUMENTS

EP 1 106 798 6/2001

(Continued)

*Primary Examiner*—Tu M Nguyen
(74) *Attorney, Agent, or Firm*—Oblon, Spivak, McClelland, Maier & Neustadt, L.L.P.

(57) ABSTRACT

A propulsion system, including a diesel engine, an air inlet circuit, and an exhaust circuit, for exhaust gases coming from the engine. The inlet circuit includes an adjustment mechanism to control the air flow into the engine and the exhaust circuit includes a nitrogen oxides trap for storage of nitrogen oxides contained in the exhaust gases. During a regeneration mode in which the exhaust gases are provided with reducing agents for regeneration of the nitrogen oxides trap, a set point is determined for the air flow, according to the operating status of the engine, the adjustment mechanism is controlled to obtain an air flow close to the set point, a main fuel injection is carried out, and a secondary fuel injection is carried out during a power phase to maintain the exhaust gas in a reducing state.

9 Claims, 3 Drawing Sheets

U.S. PATENT DOCUMENTS

| | | |
|---|---|---|
| 5,771,686 A | 6/1998 | Pischinger et al. |
| 6,082,325 A * | 7/2000 | Digeser et al. ............... 123/299 |
| 6,209,515 B1 * | 4/2001 | Gotoh et al. ................. 123/305 |
| 6,412,276 B1 * | 7/2002 | Salvat et al. ................... 60/295 |
| 6,666,019 B2 * | 12/2003 | Kawatani et al. ............... 60/286 |
| 6,698,185 B2 * | 3/2004 | Kitahara ....................... 60/274 |
| 6,796,118 B2 * | 9/2004 | Kitahara ....................... 60/285 |
| 6,823,666 B2 * | 11/2004 | Odendall ..................... 60/297 |
| 6,962,045 B2 * | 11/2005 | Kitahara et al. ................ 60/295 |
| 7,107,760 B2 * | 9/2006 | Shirakawa .................... 60/285 |
| 7,121,082 B2 * | 10/2006 | Nakagawa et al. ............ 60/285 |

FOREIGN PATENT DOCUMENTS

| | | |
|---|---|---|
| FR | 2 774 424 | 8/1999 |
| FR | 2 804 997 | 8/2001 |

* cited by examiner

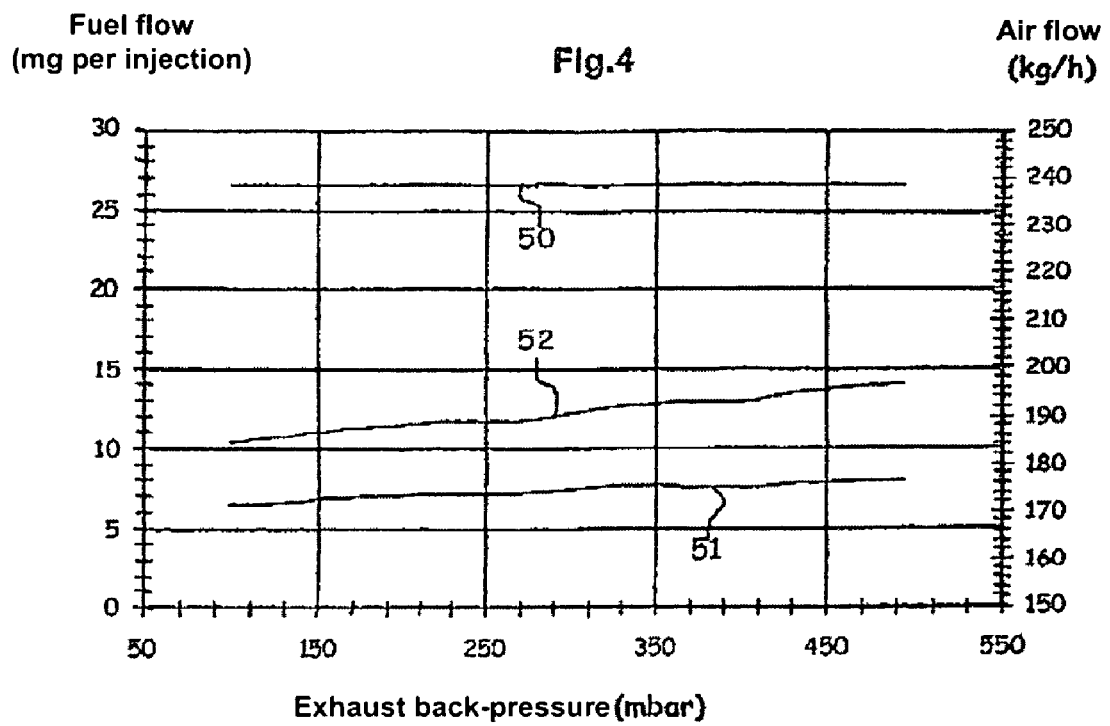
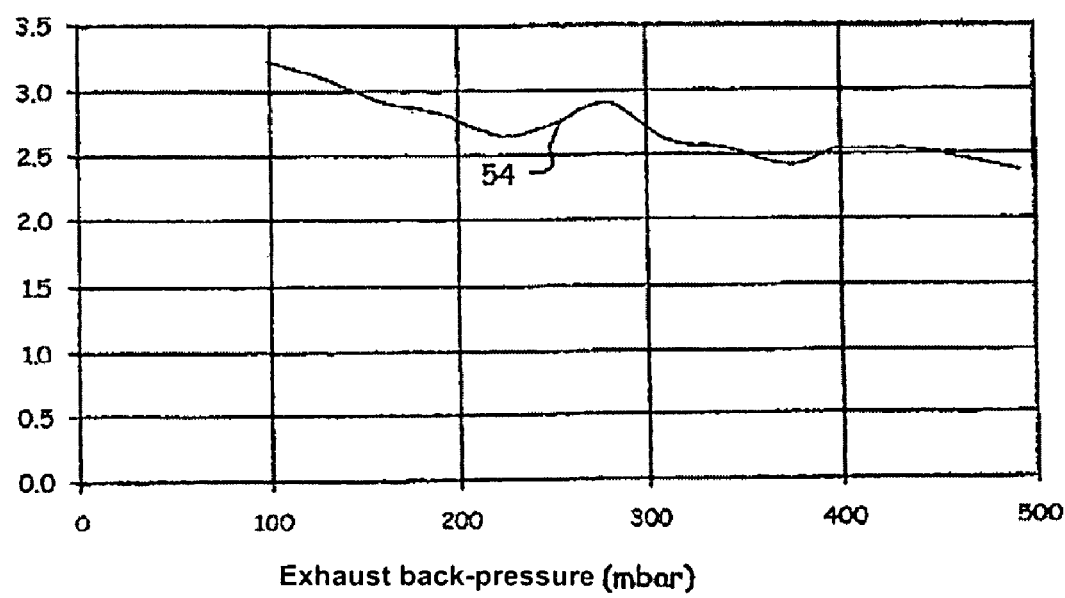

METHOD FOR CONTROL OF A PROPULSION SYSTEM COMPRISING A DIESEL ENGINE AND A NITROGEN OXIDES TRAP

BACKGROUND OF THE INVENTION

1. Field of the Invention

The invention relates to a method for control of a diesel-engine motorization system equipped with a nitrogen oxides trap, particularly when the system is also equipped with a particle-filtration unit.

2. Discussion of the Background

By virtue of anti-pollution standards, the motorization systems of vehicles are now equipped with cleaning lines. In such a line, a nitrogen oxides trap has the purpose of capturing nitrogen oxides in the exhaust gases of an internal combustion engine. For a diesel engine, the cleaning line can be augmented by a particle filter. It even is envisioned to provide a cleaning device that integrates both functions.

As regards the operation of the nitrogen oxides trap with a diesel engine, it is known to make the engine operate cyclically in such a way that the exhaust gases are reducing agents, for purging the nitrogen oxides trap. This operation is described in European Patent 560991, for example.

During normal operation, combustion in a diesel engine takes place with excess air. Consequently, nitrogen oxides are formed, and these are captured and stored by the nitrogen oxides trap. Since the storage capacity is limited, however, it is necessary to purge the nitrogen oxides trap at regular intervals, which is achieved by the operation generating reducing gases. This operation is also known as rich-mixture operation. In this phase, the exhaust gases contain unburned hydrocarbons, carbon monoxide or hydrogen, which will react with the nitrogen oxides stored in the nitrogen oxides trap in order to eliminate them.

To achieve this operation, European Patent 560991 proposes, for example, a throttle valve in an intake conduit, so that the quantity of air admitted into a combustion chamber can be reduced and a supplementary quantity of fuel can be injected, in order that combustion takes place under rich-mixture conditions.

SUMMARY OF THE INVENTION

During the change to rich-mixture operation, however, it is desirable that the torque delivered by the engine remain substantially constant, so that the operator does not have to readjust the torque demand during the transition.

It is therefore one objective of the invention to provide a method for control of a diesel-engine motorization system equipped with a nitrogen oxides trap, so that the engine delivers identical torque even during the transition to the phase of regeneration of the nitrogen oxides trap.

With this objective in mind, the object of the invention is a method for control of a motorization system comprising a diesel engine, an air-intake circuit and an exhaust circuit for exhaust gas originating from the engine, the intake circuit being provided with adjusting means for controlling the flow of air entering the engine and the exhaust circuit being provided with a nitrogen oxides trap for storage of the nitrogen oxides contained in the exhaust gases, according to which method a regeneration mode takes place in order to regenerate the nitrogen oxides trap by supplying reducing exhaust gases.

According to the invention, an air-flow index value corresponding to the operating point of the engine is determined during the regeneration mode, the adjusting means are instructed to obtain an air flow close to the index value, and a primary and secondary injection of fuel are performed, the secondary injection being adapted so as to maintain the exhaust gases in the reducing state.

Thus the desired torque can be obtained substantially by determination of the primary injection, while the richness of the exhaust gases is consequently adjusted by the quantity of fuel injected during the secondary injection. The primary injection is performed when the piston is close to the top dead point, whereas the secondary injection is performed when the piston has largely passed the top dead point, for example when the crankshaft has undergone a rotation on the order of 60° after the said top dead point, during the expansion phase.

In the case of a cleaning line containing, for example, a particle filter, a variable exhaust back-pressure is observed in the cleaning line. Consequently, even with a predetermined air flow and quantity of fuel, the delivered torque varies as a function of this exhaust back-pressure. In effect, this back-pressure increases, in particular, the resistance to escape of the burned gases, and therefore the resistance opposing a piston during the exhaust phase.

At a determined operating point, the air-flow index value remains constant. However, when the back-pressure rises, it is necessary to increase the quantity of fuel in the primary injection in order to maintain the torque, even in the presence of constant air flow. The quantity of fuel in the secondary injection will therefore be diminished, in order to maintain the same richness level of the exhaust gases. It is observed in this case that the quantity of smoke emitted increases, this increase being due to the drop in temperature of the gases at the end of the exhaust phase and to the ensuing weakening of post-oxidation reactions of the smoke.

Another objective of the invention is therefore to improve the motorization system so that the engine delivers identical torque even in the presence of a variable exhaust back-pressure, and without increasing the level of smoke emission. For that purpose, when the motorization system is provided with an accessory that generates a variable back-pressure in the exhaust circuit, the air-flow index value is preferably incremented together with the said exhaust back-pressure.

In this way, when the air flow is increased, the torque losses due to the load imposed by drawing in air are diminished, thus making it possible to reduce the quantity of fuel in the primary injection. In addition, to maintain the richness of the exhaust gases, the quantity of fuel in the secondary injection is increased, thus raising the temperature of the gases at the end of the expansion phase. In this way, afterburning of the smoke is improved.

In the case of an exhaust line provided with a particle filter, the air-flow index value is corrected by a factor that is a function of the operating point and of the degree of loading of the particle filter.

In a particular case, the degree of loading of the particle filter is evaluated by the exhaust-gas flow passing through it and by the pressure difference between the inlet and outlet.

According to another case, the degree of loading of the particle filter is evaluated by measuring the pressure upstream from the particle filter relative to the exhaust-gas flow.

BRIEF DESCRIPTION OF THE DRAWINGS

The invention will be better understood and other features and advantages will become clear by reading the description hereinafter with reference to the attached drawings, wherein:

FIG. 4 is a diagram similar to FIG. 2 for a second embodiment of the invention;

FIG. 5 is a diagram similar to FIG. 3 for the second embodiment of the invention.

DETAILED DESCRIPTION OF THE PREFERRED EMBODIMENTS

Figure 1:
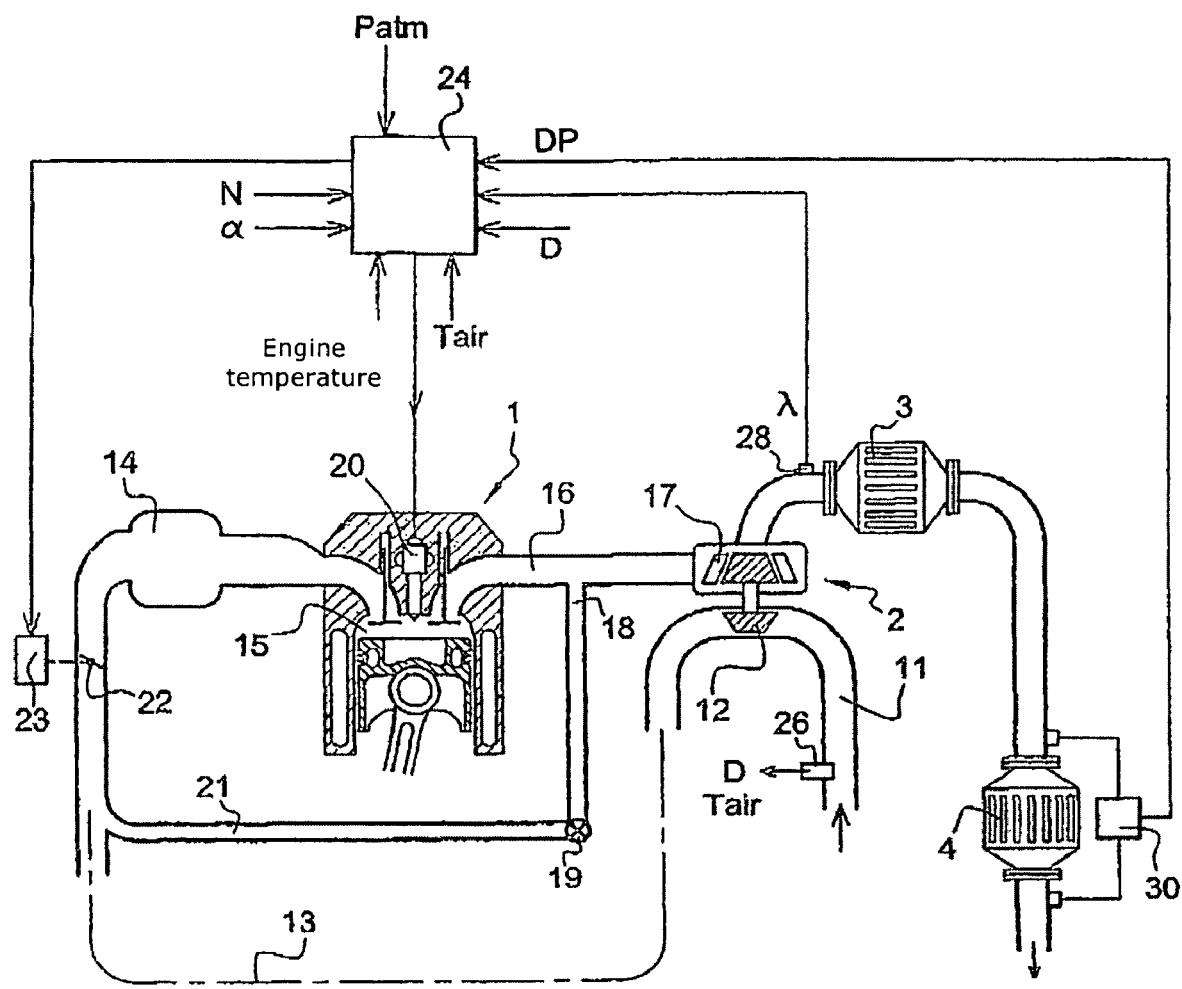
FIG. 1 is a schematic view of a motorization system according to the invention.

An inventive motorization system such as represented in FIG. 1 is provided with an engine 1 of diesel type supercharged by a turbocompressor 2, wherein the exhaust gases are treated by a nitrogen oxides trap 3 then by a particle filter 4. The engine is supplied with air by an air circuit comprising an air inlet 11, a compressor 12 of turbocompressor 2, a discharge conduit 13 and an intake pipe 14 leading into the combustion chambers of engine 1, a single chamber 15 being shown. For each combustion chamber 15, the engine is provided with an injector 20 for delivering fuel into chamber 15 according to a sequence determined by control means 24.

The exhaust gases produced by combustion are evacuated from chamber 15 by an exhaust pipe 16, and they pass through a turbine 17 of the turbocompressor, then nitrogen oxides trap 3 and particle filter 4. An exhaust-gas recycling circuit is provided with a branch connection 18 on the exhaust pipe, a valve 19 permitting passage of exhaust gases to the discharge conduit via a conduit 21.

A valve 22 is interposed in the air circuit between the outlet of conduit 21 and the inlet of intake pipe 14. Valve 22 makes it possible to vary the cross section for passage of air between completely open and partly throttled condition. An actuator 23 acts on valve 22 to determine the degree of opening thereof. It receives an index value of opening position from control means 24.

Sensors deliver information streams to the motorization system. Among these sensors, a flowmeter 26 delivers an information stream about the intake air flow D as well as an information stream about the air temperature Tair. A richness sensor 28 provides an information stream about the richness $\lambda$ of the exhaust gases. A differential pressure sensor 30 measures the pressure difference DP between the inlet and outlet of particle filter 4. All of these information streams are received by control means 24.

Control means 24 determine the index value of opening position and the fuel-injection sequence as a function of information streams received from the motorization system, such as those cited in the foregoing, and also the engine temperature Tmot, the rpm N of the engine, a value representative of engine-load demand $\alpha$, such as the position of an accelerator pedal, and the atmospheric pressure Patm.

During the normal operation of the engine, valve 22 is completely open, thus ensuring maximum air filling of the combustion chambers. The quantity of fuel injected in each cycle is such that the ratio between the mass of fuel and the mass of air is smaller than the stoichiometric ratio, thus corresponding to excess air. These conditions are also expressed by saying that the richness of combustion is lower than 1. The exhaust gases emerging from this combustion contain oxygen that was not consumed by combustion, meaning that the exhaust gases also have a richness of lower than 1.

Under these operating conditions, it is observed that nitrogen oxides are formed in the burned gases, which oxides then are absorbed by nitrogen oxides trap 3. It will be possible to reduce the nitrogen oxides during operation in regeneration mode, in which the richness is higher than 1.

Let us consider a motorization system with or without particle filter 4. In a first embodiment of the invention, the regeneration mode is controlled by determining an index value for intake air as a function of the operating point of the engine, and valve 22 is adjusted such that the measurement of air flow D by flowmeter 26 corresponds to the index value determined in this way. At the same time, a quantity of fuel to be injected during a primary injection is also determined, to obtain a torque corresponding to the demand $\alpha$, expressed for example by the position of the accelerator pedal.

To obtain exhaust gases having richness higher than 1, the primary injection is supplemented by a secondary injection. The quantity of fuel during the secondary injection is determined by a regulator that compares an index value of richness and a measurement $\lambda$ of richness sensor 28.

The index value of air flow is determined, for example, by means of a map that takes into account the engine rpm N, the demand $\alpha$, the engine temperature Tmot, the air-intake temperature Tair and the atmospheric pressure Patm.

Figure 2:
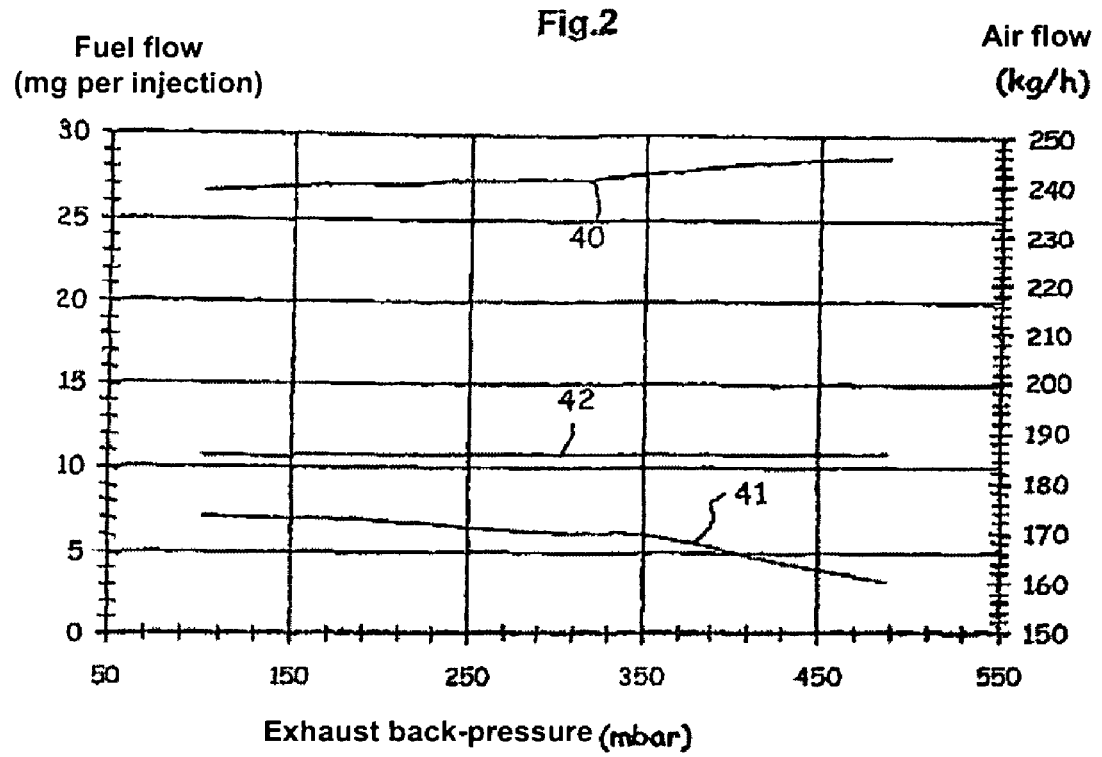
FIG. 2 is a diagram showing the evolution of fuel and air flows as a function of the exhaust back-pressure in a first embodiment of the invention.

In the case of a motorization system having a particle filter 4, the exhaust back-pressure CPE evolves as a function of the degree of loading of particle filter 4. The diagram of FIG. 2 shows the evolution of the quantities Q of fuel injected along with the evolution of the said back-pressure CPE, for a given operating point. Curve 40 represents the quantity Qp of fuel injected during the primary injection, curve 41 represents the quantity Qs of fuel injected during the secondary injection and curve 42 represents the intake air flow D.

Figure 3:
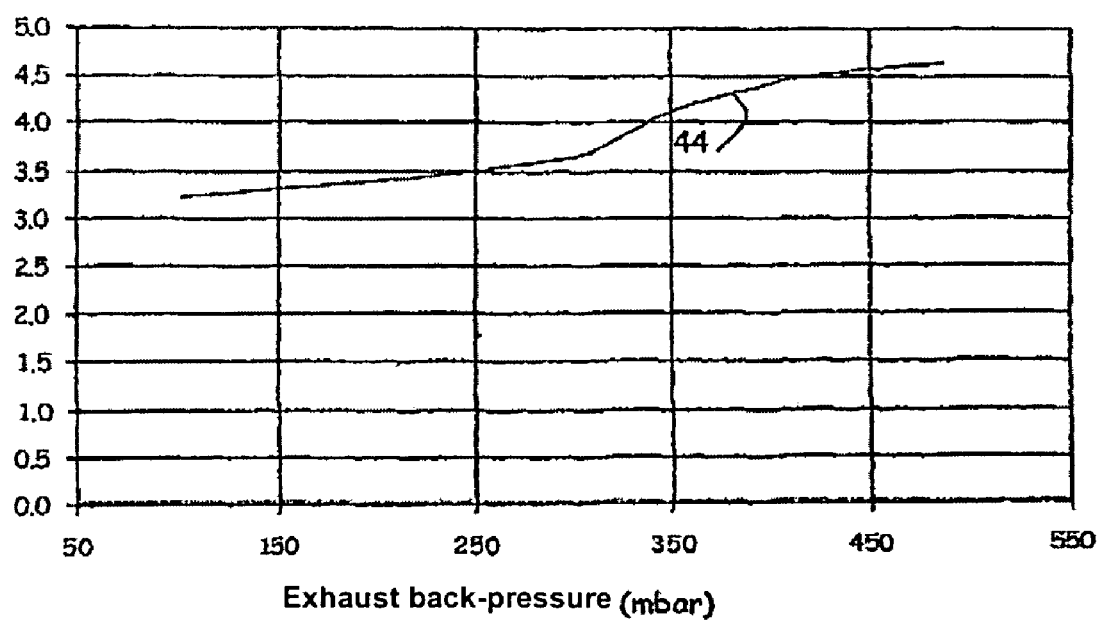
FIG. 3 is a diagram showing the evolution of the quantity of smoke emitted as a function of the exhaust back-pressure in the first embodiment.

Since the operating point is constant, the air flow does not evolve as a function of the exhaust back-pressure CPE. In contrast, to maintain the torque delivered by the engine constant when the back-pressure CPE evolves, the primary quantity Qp of fuel is adjusted, for example by an action of the operator on the accelerator pedal. As a consequence, the richness regulator must then decrease the secondary quantity Qs of fuel. By means of curve 44, FIG. 3 shows how the quantity of smoke emitted increases with elevation of the back-pressure CPE.

In a second embodiment, preferred to the first, the index value of air flow is calculated by taking into account the degree of loading of the particle filter. For example, a correction is added to the calculation of the index value according to the first embodiment, as a function of the pressure difference DP between the inlet and outlet of the particle filter and a traditional estimate of the exhaust-gas flow.

The diagram of FIG. 4 shows the evolution of the quantities Q of fuel injected along with the evolution of the said back-pressure CPE for a given operating point. Curve 50 represents the quantity Qp of fuel injected during the primary injection, curve 51 represents the quantity Qs of fuel injected during the secondary injection, while curve 52 represents the intake air flow D. It is observed that the air flow increases with the exhaust back-pressure CPE, while the quantity Qp in the primary injection remains constant, in order to maintain a constant torque. To maintain the richness of the exhaust gases constant, the quantity of fuel in the secondary injection must increase, as shown by curve 51 of FIG. 4. By means of curve 54, FIG. 5 shows a decrease in the quantity of smoke emitted with elevation of the back-pressure CPE.

The invention is not limited to the foregoing embodiments, which were described by way of examples. It will be possible to combine the nitrogen oxides trap and the particle filter in a single device. It will be possible to measure the back-pressure CPE directly upstream from turbine 17 or upstream from the particle filter and to take it into account in the calculation of the index value of air flow.

The invention claimed is:

1. A method for control of a motorization system including a diesel engine, an air-intake circuit, and an exhaust circuit for exhaust gas originating from the engine, the intake circuit including an adjusting mechanism for controlling flow of air entering the engine and the exhaust circuit including a nitrogen oxides trap for storage of nitrogen oxides contained in the exhaust gases, the method performing a regeneration mode to regenerate the nitrogen oxides trap by supplying reducing exhaust gases, the method comprising:

determining an index value of air flow corresponding to an operating point of the engine during the regeneration mode;

instructing the adjusting mechanism to obtain an air flow close to the index value;

measuring a variable back-pressure in the exhaust circuit;

performing a primary and secondary injection of fuel, the secondary injection being performed during an expansion phase and operative to maintain the exhaust gases in a reducing state; and maintaining a constant fuel flow amount of the primary injection, increasing a fuel flow amount of the secondary injection, and increasing the air flow according to an increase in the variable back-pressure such that said diesel engine delivers a constant torque during a transition to said regeneration mode.

2. A method according to claim 1, wherein, during regeneration mode, said fuel flow amount of the secondary injection is increased so as to maintain a richness of said exhaust gas higher than 1, and to maintain said constant torque.

3. A method according to claim 2, further comprising measuring said richness of said exhaust gas with a sensor positioned upstream of said nitrogen oxides trap.

4. A method according to claim 1, wherein the motorization system is provided with an accessory that generates the variable back-pressure in the exhaust circuit, and the air-flow index value is incremented together with the exhaust back-pressure.

5. A method according to claim 4, wherein the accessory that generates the variable back-pressure is a particle filter, the air-flow index value being corrected by a factor that is a function of the operating point and of a degree of loading of the particle filter.

6. A method according to claim 5, wherein the degree of loading of the particle filter is evaluated by an exhaust-gas flow passing through it and by a pressure difference between an inlet and an outlet of the particle filter.

7. A method according to claim 5, wherein the degree of loading of the particle filter is evaluated by measuring pressure upstream from the particle filter relative to an exhaust-gas flow.

8. A method according to claim 5, further comprising measuring a richness of said exhaust gas with a sensor positioned upstream of said particle filter.

9. A motorization system implementing a method for control of the motorization system, the motorization system comprising:

a diesel engine;

an air-intake circuit including an adjusting mechanism for controlling a flow of air entering the engine;

an exhaust circuit to exhaust gas originating from the engine, including a nitrogen oxides trap of to store nitrogen oxides contained in the exhaust gases; and a control unit that implements a regeneration mode to regenerate the nitrogen oxides trap by supplying reducing exhaust gases, wherein the control unit determines an index value of air flow corresponding to an operating point of the engine during the regeneration mode;

instructs the adjusting mechanism to obtain an air flow close to the index value;

measures a variable back-pressure in the exhaust circuit;

initiates a primary and secondary injection of fuel, the secondary injection being performed during an expansion phase and operative to maintain the exhaust gases in a reducing state; and maintains a constant fuel flow amount of the primary injection, increases a fuel flow amount of the secondary injection, and increases the air flow according to an increase in the variable back-pressure such that said diesel engine delivers a constant torque during a transition to said regeneration mode.

* * * * *